(12) United States Patent
Wang et al.

(10) Patent No.: US 8,591,741 B2
(45) Date of Patent: Nov. 26, 2013

(54) THIN FILM COMPOSITE MEMBRANES INCORPORATING CARBON NANOTUBES

(75) Inventors: Hua Wang, Clifton Park, NY (US); Gary William Yeager, Rexford, NY (US); Joseph Anthony Suriano, Clifton Park, NY (US); Steven Thomas Rice, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 368 days.

(21) Appl. No.: 12/895,353

(22) Filed: Sep. 30, 2010

(65) Prior Publication Data

US 2012/0080380 A1  Apr. 5, 2012

(51) Int. Cl.
*B01D 61/00* (2006.01)
*B01D 39/10* (2006.01)
*B01D 53/00* (2006.01)
*B01D 39/00* (2006.01)

(52) U.S. Cl.
USPC .............. 210/652; 210/500.38; 210/502.1; 210/321.75; 210/321.6; 210/490; 427/244; 427/245

(58) Field of Classification Search
USPC ............... 210/500.38, 490, 502.1, 500.23, 210/500.27, 321.6, 321.75; 427/244–246
See application file for complete search history.

(56) References Cited

U.S. PATENT DOCUMENTS

| | | | |
|---|---|---|---|
| 5,006,247 A * | 4/1991 | Dennison et al. | 210/500.38 |
| 7,001,556 B1 * | 2/2006 | Shambaugh | 264/210.6 |
| 7,160,531 B1 | 1/2007 | Jacques et al. | |
| 7,575,687 B2 | 8/2009 | Kurth et al. | |
| 7,931,838 B2 * | 4/2011 | Marand et al. | 264/101 |
| 7,993,524 B2 * | 8/2011 | Ratto et al. | 210/652 |
| 8,029,857 B2 * | 10/2011 | Hoek et al. | 427/245 |
| 8,177,978 B2 * | 5/2012 | Kurth et al. | 210/652 |
| 8,196,756 B2 * | 6/2012 | Ratto et al. | 210/500.41 |
| 8,231,013 B2 * | 7/2012 | Chu et al. | 210/500.1 |
| 2005/0244650 A1 | 11/2005 | Ren et al. | |
| 2006/0025515 A1 * | 2/2006 | Scaringe et al. | 524/496 |
| 2006/0257638 A1 | 11/2006 | Glatkowski et al. | |
| 2008/0022030 A1 | 1/2008 | Hagiwara et al. | |
| 2008/0149561 A1 * | 6/2008 | Chu et al. | 210/500.38 |
| 2008/0290020 A1 * | 11/2008 | Marand et al. | 210/200.27 |
| 2009/0001009 A1 | 1/2009 | Linder et al. | |
| 2009/0272692 A1 * | 11/2009 | Kurth et al. | 210/652 |
| 2009/0283475 A1 | 11/2009 | Hylton et al. | |
| 2009/0321355 A1 | 12/2009 | Ratto et al. | |
| 2010/0025330 A1 * | 2/2010 | Ratto et al. | 210/651 |
| 2010/0062156 A1 | 3/2010 | Kurth et al. | |
| 2010/0206811 A1 * | 8/2010 | Ng et al. | 210/654 |
| 2010/0224555 A1 | 9/2010 | Hoek et al. | |

FOREIGN PATENT DOCUMENTS

| | | | |
|---|---|---|---|
| EP | 1362938 A1 | 11/2003 | |
| WO | WO2009025900 A2 | 2/2009 | |
| WO | WO2009035415 A1 | 3/2009 | |

OTHER PUBLICATIONS

Hinds et al., "Aligned Multiwalled Carbon Nanotube Membranes", Science, vol. 303, pp. 62-65, Jan. 2, 2004.

Choi et al., "Modification of Performances of Various Membranes Using MWNTs as a Modifier", Macromol. Symp., pp. 610-617, 2007.

Liu et al., "Diffusion Dynamics of Water Controlled by Topology of Potential Energy Surface Inside Carbon Nanotubes", Physical Review B, vol. 77, pp. 125438-1-125438-7, 2008.

Park et al., "Enhancement of Chlorine Resistance in Carbon Nanotube-Based Nanocomposite Reverse Osmosis Membranes", Desalination and Water Treatment, vol. 15, pp. 198-204, 2010.

Search Report and Written Opinion from corresponding PCT Application No. PCT/US2011/045140 dated Jan. 20, 2012.

\* cited by examiner

*Primary Examiner* — Ana Fortuna
(74) *Attorney, Agent, or Firm* — Mary Louise Stanford

(57) ABSTRACT

Processes for manufacturing a thin film composite membrane comprising multi-walled carbon nanotubes include contacting under interfacial polymerization conditions an organic solution comprising a polyacid halide with an aqueous solution comprising a polyamine to form a thin film composite membrane on a surface of a porous base membrane; at least one of the organic solution and the aqueous solution further including multi-walled carbon nanotubes having an outside diameter of less than about 30 nm.

15 Claims, No Drawings

THIN FILM COMPOSITE MEMBRANES INCORPORATING CARBON NANOTUBES

CROSS-REFERENCE TO RELATED APPLICATIONS

This application is related to U.S. patent application Ser. No. 12/895,365, filed on Sep. 30, 2010, pending, the entire disclosure of which is incorporated herein by reference.

BACKGROUND

Reverse osmosis (RO) desalination uses membrane technology to transform seawater and brackish water into fresh water for drinking, irrigation and industrial applications. Reverse osmosis desalination processes require substantially less energy than thermal desalination processes. As a result, the majority of recent commercial projects use more cost-effective reverse osmosis membranes to produce fresh water from seawater or brackish water. Over the years, advances in membrane technology and energy recovery devices have made reverse osmosis more affordable and efficient. Despite its capacity to efficiently remove ionic species at as high as 99.8% salt rejection, there remains a need for reverse osmosis membranes that possess improved flux characteristics while maintaining useful rejection characteristics.

Reverse osmosis is the process of forcing a solvent from a region of high solute concentration through a membrane to a region of low solute concentration by applying a pressure in excess of the osmotic pressure. This is the reverse of the normal osmosis process, which is the natural movement of solvent from an area of low solute concentration, through a membrane, to an area of high solute concentration when no external pressure is applied. The membrane here is semipermeable, meaning it allows the passage of solvent but not of solute. The membranes used for reverse osmosis have a dense barrier layer where most separation occurs. In most cases the membrane is designed to allow only water to pass through this dense layer while preventing the passage of solutes (such as salt ions). Examples of reverse osmosis processes are the purification of brackish water and seawater, where often less than 1% of the impurity species in the seawater or brackish water are found in the permeate. The reverse osmosis process requires that a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure which must be overcome.

Nanofiltration, in concept and operation, is much the same as reverse osmosis. The key difference is the degree of removal of monovalent ions such as chlorides. Reverse osmosis removes about 99% of the monovalent ions. Nanofiltration membranes removal of monovalent ions varies between 50% to 90% depending on the material and manufacture of the membrane. Nanofiltration membranes and systems are used for water softening, food and pharmaceutical applications. An example of a nanofiltration process is the desalting of a sugar solution, where 80% of the salt passes through the membrane with the water and 95% of the sugar is retained by the membrane.

It is well known that for a given polymer, there is a flux-rejection trade-off curve that defines the upper bound of the flux-rejection relationship. One can obtain high membrane flux with trade-off in terms of salt rejection. On the other hand, one can obtain high membrane salt rejection with trade-off in terms of membrane water permeability. It is highly desirable to obtain membrane materials with performance above the trade-off curve, i.e., achieving both high flux and high salt rejection.

Nanotubes such as carbon and boron nanotubes are fundamentally new nanoporous materials that have great potential for membrane applications. The current methods of synthesis of CNT membranes (Hinds et al Science, 2004; Holt et. al. Science, 2006; Formasiero et. al., PNAS, 2008) involve multiple steps and are limited to making membrane samples of extremely small area. They are not scalable to large surface areas necessary for the fabrication of commercial membranes for practical applications. Membranes containing carbon nanotubes have been disclosed for use in purifying water. For example, WO 2006/060721, assigned to National University of Singapore, describes thin film composite (TFC) membranes containing multi-walled carbon nanotubes (MWNT) in an active layer prepared by interfacial polymerization. The MWNTs are characterized as having an outside diameter of 30-50 nm. However, further improvements in the performance of TFC membranes for reverse osmosis applications are desirable.

BRIEF DESCRIPTION

It has been unexpectedly discovered that incorporating multi-walled carbon nanotubes having an outside diameter of less than about 30 nm in a thin film composite membrane by an interfacial polymerization process may yield an improvement in properties of the membrane.

DETAILED DESCRIPTION

In a first aspect, the present invention relates to processes for manufacturing a thin film composite membrane comprising multi-walled carbon nanotubes. The processes include contacting under interfacial polymerization conditions an organic solution comprising a polyacid halide with an aqueous solution comprising a polyamine to form a thin film composite membrane on a surface of a porous base membrane; at least one of the organic solution and the aqueous solution further including multi-walled carbon nanotubes having an outside diameter of less than about 30 nm.

The thin film composite (TFC) membranes that may be prepared by a process according to the present invention are composed of a separating functional layer formed on a porous base support. The separating functional layer is thin in order to maximize membrane flux performance, and is formed on a porous support or base membrane to provide mechanical strength. Examples of TFC membranes that may be prepared include, but are not limited to, reverse osmosis membranes composed of a polyamide separating functional layer formed on a porous polysulfone support, nanofiltration membranes, and other thin film composite membrane.

Interfacial polymerization includes contacting an aqueous solution of one or more nucleophilic monomers onto a porous support membrane; followed by coating an organic solution, generally in an aliphatic solvent, containing one or more electrophilic monomers. At the interface of the two solution layers, which lies near the surface of the porous support, a thin film polymer is formed from condensation of the electrophilic and nucleophilic monomers and is adherent to the porous support. The rate of thin film formation may be accelerated by heating or addition of catalysts. The polyacid halide monomer on contact with the polyamine monomer reacts on the surface of the porous base membrane to afford a polyamide disposed on the surface of the porous support membrane. Suitable monomers useful in the present invention are described below.

As described above, the membrane comprises a polymer having an amine group. The polymer may be produced by interfacial polymerization. Interfacial polymerization includes a process widely used for the synthesis of thin film membranes for reverse osmosis, hyperfiltration, and nanofiltration. Interfacial polymerization includes coating a first solution, generally aqueous, of one or more nucleophilic monomers onto a porous base support; followed by coating a second solution, generally in an aliphatic solvent, containing one or more electrophilic monomers. The second solution is immiscible with the first solution. At the interface of the two solution layers, which lies near the surface of the porous base support, a thin film polymer is formed from condensation of the electrophilic and nucleophilic monomers and is adherent to the porous base support. The rate of thin film formation may be accelerated by heating or addition of catalysts.

Examples of nucleophilic monomers include, but are not limited to, amine containing monomers such as polyethylenimines; cyclohexanediamines; 1,2-diaminocyclohexane; 1,4-diaminocyclohexane; piperazine; methyl piperazine; dimethylpiperazine (e.g. 2,5-dimethyl piperazine); homopiperazine; 1,3-bis(piperidyl)propane; 4-aminomethylpiperazine; cyclohexanetriamines (e.g. 1,3,5-triaminocyclohexane); xylylenediamines (o-, m-, p-xylenediamine); phenylenediamines; (e.g. m-phenylene diamine and p-phenylenediamine, 3,5-diaminobenzoic acid, 3,5-diamonsulfonic acid); chlorophenylenediamines (e.g. 4- or 5-chloro-m-phenylenediamine); benzenetriamines (e.g. 1,3,5-benzenetriamine, 1,2,4-triaminobenzene); bis(aminobenzyl)aniline; tetraaminobenzenes; diaminobiphenyls (e.g. 4,4'-diaminobiphenyl; tetrakis(aminomethyl)methane; diaminodiphenylmethanes; N,N'-diphenylethylenediamine; aminobenzamides (e.g. 4-aminobenzamide, 3,3'-diaminobenzamide; 3,5-diaminobenzamide; 3,5-diaminobenzamide; 3,3'5,5'-tetraaminobenzamide); either individually or in any combinations thereof.

Particularly useful nucleophilic monomers for the present invention include m-phenylenediamine, p-phenylenediamine, 1,3,5-triaminobenzene, piperazine, 4-aminomethylpiperidine, and either individually or in any combinations thereof. More particularly, nucleophilic monomer useful in the present invention includes m-phenylene diamine.

Examples of electrophilic monomers include, but are not limited to, acid halide-terminated polyamide oligomers (e.g. copolymers of piperazine with an excess of isophthaloyl chloride); benzene dicarboxylic acid halides (e.g. isophthaloyl chloride or terephthaloyl chloride); benzene tricarboxylic acid halides (e.g. trimesoyl chloride or trimellitic acid trichloride; cyclohexane dicarboxylic acid halides (e.g. 1,3-cyclohexane dicarboxylic acid chloride or 1,4-cyclohexane dicarboxylic acid chloride); cyclohexane tricarboxylic acid halides (e.g. cis-1,3,5-cyclohexane tricarboxylic acid trichloride); pyridine dicarboxylic acid halides (e.g. quinolinic acid dichloride or dipicolinic acid dichloride); trimellitic anhydride acid halides; benzene tetra carboxylic acid halides (e.g. pyromellitic acid tetrachloride); pyromellitic acid dianhydride; pyridine tricarboxylic acid halides; sebacic acid halides; azelaic acid halides; adipic acid halides; dodecanedioic acid halides; toluene diisocyanate; methylenebis (phenyl isocyanates); naphthalene diisocyanates; bitolyl diisocyanates; hexamethylene diisocyanate; phenylene diisocyanates; isocyanato benzene dicarboxylic acid halides (e.g. 5-isocyanato isophthaloyl chloride); haloformyloxy benzene dicarboxylic acid halides (e.g. 5-chloroformyloxy isophthaloyl chloride); dihalosulfonyl benzenes (e.g. 1,3-benzenedisulfonic acid chloride); halosulfonyl benzene dicarboxylic acid halides (e.g. 3-chlorosulfonyl isophthaloyl chloride); 1,3,6-tri(chlorosulfonyl)naphthalene; 1,3,7 tri(chlorosulfonyl)napthalene; trihalosulfonyl benzenes (e.g. 1,3,5-trichlorosulfonyl benzene); and cyclopentanetetracarboxylic acid halides, either individually or in any combinations thereof.

Particular electrophilic monomers include, but are not limited to, terephthaloyl chloride, isophthaloyl chloride, 5-isocyanato isophthaloyl chloride, 5-chloroformyloxy isophthaloyl chloride, 5-chlorosulfonyl isophthaloyl chloride, 1,3,6-(trichlorosulfonyl)naphthalene, 1,3,7-(trichlorosulfonyl) napthalene, 1,3,5-trichlorosulfonyl benzene, either individually or in any combinations thereof. More particular electrophilic monomers include trimesoyl chloride acid chloride.

The interfacial polymerization reaction may be carried out at a temperature ranging from about 5° C. to about 60° C., preferably from about 10° C. to about 40° C. to produce an interfacial polymer membrane. Examples of interfacial polymers produced therefrom include polyamide, polysulfonamide, polyurethane, polyurea, and polyesteramides, either individually or in any combinations thereof.

In one example, for illustration and not limitation, a porous base support includes a support material having a surface pore size in the approximate range from about 50 Angstroms to about 5000 Angstroms. The pore sizes should be sufficiently large so that a permeate solvent can pass through the support without reducing the flux of the composite. However, the pores should not be so large that the permselective polymer membrane will either be unable to bridge or form across the pores, or tend to fill up or penetrate too far into the pores, thus producing an effectively thicker membrane than 200 nanometers. U.S. Pat. No. 4,814,082 (W. J. Wrasidlo) and U.S. Pat. No. 4,783,346 (S. A. Sundet) are illustrative of methods of choosing and preparing a porous base support for interfacial TFC (thin film composite) membrane formation.

Non-limiting examples of the material forming the porous base support include polysulfone, polyether sulfone, polyacrylonitrile, cellulose ester, polypropylene, polyvinyl chloride, polyvinylidene fluoride and poly(arylether) ketones. Other porous materials might be used as well, such as ceramics, glass and metals, in a porous configuration. A wide variety of suitable porous base membranes are either available commercially or may be prepared using techniques known to those of ordinary skill in the art. In some embodiments, a porous base membrane which is a polysulfone membrane or a porous polyethersulfone membrane are used because of their desirable mechanical and chemical properties. Those of ordinary skill in the art will be able to make the selection from among the suitable materials. The thickness of the material forming the porous base support may be between about 75 and about 250 microns thick, although other thicknesses may be used. For example, a 25 microns thick porous base support permits production of higher flux films. In some cases, the porous base support may be relatively thick, for example, 2.5 cm or more, where aqueous solution is applied to only one side, which is subsequently contacted with the organic solution, forming the interface at which polymerization occurs. The polymeric porous base support may be reinforced by backing with a fabric or a non-woven web material. Non-limiting examples include films, sheets, and nets such as a nonwoven polyester cloth. The polymer of the porous base support may permeate through the pores, be attached on both sides of the support, or be attached substantially on one side of the support.

In order to improve permeability and/or salt rejection, the thin film composite membrane may be post-treated with an oxidizing solution, such as a sodium hypochlorite solution. The concentration of sodium hypochlorite in the solution may range from about 50 ppm to about 4000 ppm, and, in some embodiments, from about 50 ppm to about 500 ppm.

In processes according to the present invention, the organic solution or the aqueous solution, or both the organic solution and the aqueous solution, may include, in addition to the polyacid halide monomer or the polyamine monomer, multi-walled carbon nanotubes dispersed therein. Suitable organic solvents include aliphatic hydrocarbons, alcohols, ketones, esters, ethers, amides, and mixtures thereof. In particular embodiments, aliphatic hydrocarbons such as decalins, and isoparaffins, and mixtures thereof may be used. The organic solution may additionally include a cyclic ketone such as cyclooctanone, cycloheptanone, 2 methylcyclohexanone, cyclohexanone, cyclohexene-3-one, cyclopentanone, cyclobutanone, 3-ketotetrahydrofuran, 3-ketotetrahydrothiophene, or 3-ketoxetane, particularly, cyclohexanone. Aqueous dispersions may include dispersing aids such as polyvinylpyrrolidone, or surfactants, particularly non-ionic surfactants.

Carbon nanotubes have a cylindrical nanostructure with an inside diameter (ID) and outside diameters (OD). While single-walled carbon nanotubes (SWNT) are composed of a single layer of graphite in the shape of a tube or cylinder, multiwalled nanotubes (MWNT) are made up of a single rolled layer of graphite or multiple layers of graphite, arranged in concentric cylinders. The MWNTs for use in the processes and membranes of the present invention have an outside diameter of less than about 30 nm, particularly less than about 8 nm. The inner diameter of the multi-walled carbon nanotubes is less than about 8 nm, and particularly useful are nanotubes with inner diameters ranging from about 2 to about 5 nm. In the context of the present invention, a MWNT designated as having an outside diameter of less than about 30 nm, this means that greater than about 50% of the MWNT particles have an outer diameter of less than about 30 nm, in some embodiments, more than about 75% of the MWNT particles have an outer diameter of less than about 30 nm. Similarly, when MWNTs are designated as having an outer diameter of less than about 8 nm, it means that more than about 50% of the MWNT particles have an outer diameter of less than about 8 nm, in some embodiments, more than about 75% of the MWNT particles have an outer diameter of less than about 8 nm.

Concentration of the multi-walled carbon nanotubes in the organic solution or the aqueous solution is at least 0.025% w/w, and may range from about 0.025% w/w to about 10% w/w in some embodiments, and in others, ranges from about 0.025% w/w to about 5% w/w. In yet other embodiments, the concentration of the multi-walled carbon nanotubes ranges from about 0.05% w/w to about 1% w/w. In yet other embodiments, the concentration of the multi-walled carbon nanotubes ranges from about 0.1% w/w to about 1% w/w. In yet other embodiments, the concentration of the multi-walled carbon nanotubes ranges from about 0.1% w/w to about 0.5% w/w. The amount of carbon nanotubes contained in the final product ranges from about 0.1%-30% by weight in some embodiments; in other embodiments, from about 1%-10% by weight, and in still other embodiments, from about 0.5%-5% by weight.

In many embodiments, dispersions of carbon nanotubes in non-polar hydrocarbons such as hexane, cyclohexane, and isoparaffins are stable only for short periods, even after prolonged sonication. Dispersion instability may be minimized by incorporating an in-line, continuous mixer/homogenizer. A dispersion of nanotubes may be mixed with the monomer-containing solutions prior to use in the coating operation using an in-line, continuous mixer/homogenizer in the processes of the present invention in order to maximize stability of the nanotube dispersions. Generally, a higher-volume stream of a solution of one of the monomers is mixed with a lower volume stream of a carbon nanotube dispersion to form a new dispersion containing both nanotubes and one of the monomers just before the combined coating solution mixture is dispensed on the porous support membrane. Suitable mixing/homogenizing devices include static mixers, ultrasonic mixers, dynamic mixers, and other mechanical devices such as industrial mixers and blenders with various types of blades, shafts, and impellers. Static mixers and ultrasonic mixers are examples of preferred devices due to their simplicity and effectiveness.

The nanotubes dispersion may be under constant or intermittent mixing during the coating operation to ensure the homogeneous dispersion of nanotubes in the coating solution(s). The mixing device includes (but not limited to) ultrasonic mixing device, dynamic mixer, and other mechanical devices such as industrial mixers and blenders with various types of blades, shafts, and impellers to make a good quality homogeneous mixture. Ultrasonic mixing is one of the preferred methods.

The advantage of separating the nanotube dispersion from the monomer solution is that it decouples the various (and often conflicting) requirements of nanotube dispersion stability and solvent compatibility with the porous support. For example, conventional coating formulation (including conventional solvents such as hexane and ISOPAR™ G) may be used in the monomer solution(s), while more aggressive solvents that are better at dispersing nanotubes may be used in making the nanotube dispersion prior to combining the two. Since the residence time between the in-line mixing and the coating is minimized, the nanotubes in the dispersion do not have time to agglomerate and segregate. Also, since the solvent used in dispersing nanotubes is typically a minor fraction in the final coating formulation after the in-line mixing, the problem of solvent attacking the porous support is resolved.

Coating methods typically include dip coating, slot die coating, and spray coating. In some embodiments, when dip coating or slit die coating is used for both aqueous and organic coating solutions, the coating tanks may be used as catch pans to recycle the unused coating solutions. The nanotube dispersions may be in-line homogenized outside the coating tanks and recirculated and replenished during the coating operation.

EXAMPLES

The following examples illustrate a process according to the present invention.

General Procedures

Membrane Fabrication Using Handframe Coating Apparatus: Composite membranes were prepared using a handframe coating apparatus consisting of a matched pair of frames in which the porous base membrane could be fixed and subsequently coated with the coating solution. The following procedure was used. The porous base membrane was first soaked in deionized water for at least 30 minutes. The wet porous base membrane was fixed between two 8 inch by 11 inch stainless steel frames and kept covered with water until further processed. Excess water was removed from the porous base membrane and one surface of the porous base membrane was treated with 200 grams of an aqueous solution comprising meta-phenylenediamine (2.6% by weight), triethylamine salt of camphorsulfonic acid (TEACSA) (6.6% by weight), the upper portion of the frame confining the aqueous solution to the surface of the porous base membrane. After 30 seconds, the aqueous solution was removed from the surface of the porous base membrane by tilting the assembly comprising the frame and the treated porous base membrane until only isolated drops of the aqueous solution were visible on the surface of the treated porous base membrane. The treated surface was then exposed to a gentle stream of air to remove isolated drops of the aqueous solution. The treated surface of the porous base membrane was then contacted with 100 grams of an organic solution containing trimesoyl chloride (0.16% by weight) and carbon nanotubes (type and amount shown in examples) in ISOPAR™ G solvent. Prior to application of the organic solution, the organic solution containing carbon nanotubes was first sonicated using a bath sonicator (Branson 5510 model) for 60 minutes and then let stand for 20 minutes. Excess organic solution was then removed by tilting a corner of the frame and collecting the excess organic solution in a suitable collection vessel. The frame was then returned to a horizontal position and the remaining film of organic solution on the treated surface of the porous base membrane was allowed to stand for about 1 minute. The remaining organic solution was drained from the treated surface of the porous base membrane with the aid of a gentle air stream. The treated assembly was then placed in a drying oven and maintained at a temperature of 90° C. for about 6 minutes after which the composite membrane was ready for testing.

Membrane Performance Testing: Membrane tests were carried out on composite membranes configured as a flat sheet in a cross-flow test cell apparatus (Sterlitech Corp., Kent Wash.) (model CF042) with an effective membrane area of 35.68 cm$^2$. The test cells were plumbed two in series in each of 6 parallel test lines. Each line of cells was equipped with a valve to turn feed flow on/off and regulate concentrate flow rate, which was set to 1 gallon per minute (gpm) in all tests. The test apparatus was equipped with a temperature control system that included a temperature measurement probe, a heat exchanger configured to remove excess heat caused by pumping, and an air-cooled chiller configured to reduce the temperature of the coolant circulated through the heat exchanger.

Composite membranes were first tested with a fluorescent red dye (rhodamine WT from Cole-Parmer) to detect defects. A dye solution comprising 1% rhodamine red dye was sprayed on the polyamide surface of the composite membrane and allowed to stand for 1 minute, after which time the red dye was rinsed off. Since rhodamine red dye does not stain polyamide, but stains polysulfone strongly, a defect-free membrane should show no dye stain after thorough rinse. On the other hand, dye stain patterns (e.g. red spots or other irregular dye staining patterns) indicate defects in the composite membranes. The membranes were cut into 2 inch×6 inch rectangular coupons, and loaded into cross flow test cells. Three coupons (3 replicates) from each type of membranes were tested under the same conditions and the results obtained were averaged to obtain mean performance values and standard deviations. The membrane coupons were first cleaned by circulating water across the membrane in the test cells for 30 minutes to remove any residual chemicals and dyes. Then, synthetic brackish water containing 500 ppm sodium chloride was circulated across membrane at 115 psi and 25° C. The pH of the water was controlled at pH 7.5. After one hour of operation, permeate samples were collected for 10 minutes and analyzed.

After the initial test period, test coupons were exposed to a 70 ppm aqueous solution of sodium hypochlorite at 25° C. for 30 minutes. The test coupons were then rinsed with deionized water for 1 hour.

Following the "chlorination" procedure, the test coupons were again tested for reverse osmosis membrane performance with the synthetic feed solution containing 500 ppm sodium chloride used before as described herein. Solution conductivities and temperatures were measured with a CON 11 conductivity meter (Oakton Instruments). Conductivites were compensated to measurement at 25° C. The pH was measured with a Russell RL060P portable pH meter (Thermo Electron Corp). Permeate was collected in a graduated cylinder. The permeate was weighed on a Navigator balance and time intervals were recorded with a Fisher Scientific stopwatch. Permeability, or "A value", of each membrane was determined at standard temperatures (77° F. or 25° C.). Permeability is defined as the rate of flow through the membrane per unit area per unit pressure. A values were calculated from permeate weight, collection time, membrane area, and trans-membrane pressure. A values reported herein have units of $10^{-5}$ cm$^3$/s-cm$^2$-atm. Salt concentrations determined from the conductivities of permeate and feed solutions were used to calculate salt rejection values. Conductivities of the permeate and feed solutions were measured, and salt concentrations calculated from the conductivity values, to yield salt rejection values.

In some cases, the product composite membrane was rinsed with hot deionized water and stored in a refrigerator before until testing or element fabrication. In one case, the product composite membrane was treated with a solution containing polyvinyl alcohol solution and then dried before storage, testing, or element fabrication.

Comparative Example 1

A polyamide coated thin film composite RO membrane was fabricated using a handframe coating apparatus. An aqueous coating solution (Solution A) was prepared and contained 2.6 wt % m-phenylene diamine (mPD) and 6.6 wt % triethylammonium camphorsulfonate (TEACSA). An organic coating solution (Solution B) was prepared and contained 0.16 wt % trimesoyl chloride (TMC) in ISOPAR™ G. A wet polysulfone porous support film was first coated with the aqueous solution containing the m-phenylenediamine (Solution A) and then coated with the organic solution comprising the trimesoyl chloride (Solution B) to effect an interfacial polymerization reaction between the diamine and the triacid chloride at one surface of the polysulfone porous support film, thereby producing a thin film composite reverse osmosis membrane. The product membrane was tested in triplicate using a solution of magnesium sulfate (500 ppm in NaCl) at an applied operating pressure of 115 pounds per square inch (psi) and operating crossflow rate of 1.0 gram per minute (grams per mole), at pH 7.0. The permeability and salt passage results are shown in Table 1.

Comparative Example 2

Polyamide thin film composite RO membranes were fabricated as in Comparative Example 1 with the exception that the organic coating solution (Solution A) also contained 0.1 wt % fullerene C60 (BU-602-Bucky USA, Houston Tex.). The product composite membranes were tested and membrane A-values and salt passage properties were measured. Data are shown in Table 1. The data show that coating solution contains fullerene C60 nano-particles showed no significant increase in performance relative to a control (Comparative Example 1).

Comparative Example 3

Polyamide thin film composite RO membranes were fabricated as in Comparative Example 1 with the exception that the organic coating solution (Solution A) also included 0.1% w/w single-walled carbon nanotubes (SWNT, P-3, Carbon Solutions, Inc, Riverside, Calif., I.D. ~1.4 nm, O.D.<2 nm. The product composite membranes were tested and membrane A-values and salt passage properties were measured. Data are presented in Table 1.

TABLE 1

| | Nanoparticle Description | Before Treatment of Membrane with Hypochlorite | | | After Treatment of Membrane with Hypochlorite | | |
|---|---|---|---|---|---|---|---|
| | | A Value, $10^{-5}$ cm$^3$/s-cm$^2$-atm | % A value increase over control | % Salt Passage | A Value, $10^{-5}$ cm$^3$/s-cm$^2$-atm | % A value increase over control | % Salt Passage |
| Comparative Example 1 | — | 3.7 | | 0.56 | 4.5 | | 0.36 |
| Comparative Example 2 | fullerene C60 | 3.8 | | 0.40 | 4.7 | | 0.30 |
| Comparative Example 3 | 0.1 wt % SWNT | 4.4 | 18.9% | 0.63 | 5.7 | 26.7% | 0.21 |
| Comparative Example 3 | 0.1 wt % MWNT (5-15 nm ID, 30-50 OD) | 5.5 | 48.6% | 0.36 | 5.9 | 31% | 0.28 |
| Example 1 | 0.05 wt % MWNT (2-5 nm ID/<8 OD) | 5.9 | 59.5% | 0.67 | 7.5 | 66.7% | 0.40 |
| Example 2 | 0.1 wt % MWNT (2-5 nm ID/<8 OD) | 6.3 | 70% | 0.32 | 9.9 | 120% | 0.31 |

Comparative Example 4

Polyamide thin film composite RO membranes were fabricated as in Comparative Example 1 with the exception that the organic coating solution (Solution A) further comprised 0.1 wt % multi-walled carbon nanotubes (1238YJS, Nanostructured & Amorphous Materials, Inc., Houston, Tex.) with inner diameters of 5-15 nm, outside diameters of 30-50 nm, and 0.5-2 μm in length. The product composite membranes were tested and membrane A-values and salt passage properties were measured. Data is shown in Table 1.

Examples 1 and 2

Polyamide thin film composite RO membranes were fabricated as in Comparative Example 1 with the exception that the organic coating solution (Solution A) further comprised 0.05% or 0.1 wt % w/w multi-walled carbon nanotubes (1225YJS, Nanostructured & Amorphous Materials, Inc., Houston, Tex.) I.D. 2-5 nm, O.D.<8 nm, and 0.5-2 μm in length. The product composite membranes were tested and membrane A-values and salt passage properties were measured. Data are gathered in Table 1. The data show that coating solution contains SWNT showed had a significant increase in performance relative to the control without CNTs (Comparative Example 1), controls with SWNTs (Comparative Example 3), and controls with large OD (30-50 nm) MWNT (Comparative Example 4).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A process for manufacturing a thin film composite membrane comprising multi-walled carbon nanotubes, said process comprising contacting under interfacial polymerization conditions an organic solution comprising a polyacid halide with an aqueous solution comprising a polyamine to form a thin film composite membrane on a surface of a porous base membrane;
    and contacting the thin film composite membrane with a sodium hypochlorite solution, to yield a thin film composite membrane having salt passage of less than 0.4% and flux of at least $7.5 \times 10^{-5}$ cm$^3$/s-cm$^2$-atm;
    wherein at least one of the organic solution and the aqueous solution further comprises multi-walled carbon nanotubes having an outside diameter of less than 8 nm.

2. A process according to claim 1, wherein the organic solution comprises of the multi-walled carbon nanotubes, and the aqueous solution is free of the multi-walled carbon nanotubes.

3. A process according to claim 1, wherein the concentration of the multi-walled carbon nanotubes is at least 0.025% w/w.

4. A process according to claim 1, wherein the concentration of the multi-walled carbon nanotubes ranges from about 0.025% w/w to about 10% w/w.

5. A process according to claim 1, wherein the concentration of the multi-walled carbon nanotubes ranges from about 0.025% w/w to about 5% w/w.

6. A process according to claim 1, wherein the concentration of the multi-walled carbon nanotubes ranges from about 0.05% w/w to about 1% w/w.

7. A process according to claim 1, wherein the inside diameter of the multi-walled carbon nanotubes is less than about 8 nm.

8. A process according to claim 1, wherein the inside diameter of the multi-walled carbon nanotubes is about 2-5 nm.

9. A process according to claim 1, wherein the polyacid halide is trimesoyl chloride.

10. A process according to claim 1, wherein the polyamine is para-phenylene diamine.

11. A process according to claim 1, wherein the concentration of sodium hypochlorite in the solution ranges from about 50 ppm to about 4000 ppm.

12. A thin film composite membrane prepared by the process of claim 1.

13. A reverse osmosis element comprising a thin film composite membrane according to claim 1.

14. A desalination system comprising at least one reverse osmosis element according to claim 13.

15. A desalination process comprising contacting seawater or brackish water with a thin film composite membrane according to claim 13.

\* \* \* \* \*